US011210213B2

(12) United States Patent
Um

(10) Patent No.: US 11,210,213 B2
(45) Date of Patent: Dec. 28, 2021

(54) CONTROLLER AND OPERATION METHOD THEREOF

(71) Applicant: SK hynix Inc., Gyeonggi-do (KR)

(72) Inventor: Gi-Pyo Um, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 14 days.

(21) Appl. No.: 16/678,664

(22) Filed: Nov. 8, 2019

(65) Prior Publication Data

US 2020/0183851 A1 Jun. 11, 2020

(30) Foreign Application Priority Data

Dec. 5, 2018 (KR) .................. 10-2018-0155011

(51) Int. Cl.
*G06F 12/02* (2006.01)
*G06F 13/16* (2006.01)
*G06F 11/07* (2006.01)

(52) U.S. Cl.
CPC ........ *G06F 12/0253* (2013.01); *G06F 11/076* (2013.01); *G06F 12/0246* (2013.01); *G06F 13/1668* (2013.01); *G06F 2212/702* (2013.01)

(58) Field of Classification Search
CPC ............. G06F 12/0253; G06F 12/0246; G06F 12/0261; G06F 12/0263; G06F 2212/7205; G06F 2212/702
See application file for complete search history.

(56) References Cited

U.S. PATENT DOCUMENTS

| 2007/0186065 | A1* | 8/2007 | Lee | G06F 3/0656 |
| | | | | 711/159 |
| 2011/0022778 | A1* | 1/2011 | Schibilla | G06F 12/0246 |
| | | | | 711/103 |
| 2014/0032817 | A1* | 1/2014 | Bux | G06F 12/0261 |
| | | | | 711/103 |
| 2015/0261671 | A1* | 9/2015 | Chu | G06F 12/0246 |
| | | | | 711/103 |
| 2017/0052719 | A1* | 2/2017 | Boitei | G06F 12/0246 |
| 2017/0228313 | A1* | 8/2017 | Boitei | G06F 3/0679 |
| 2019/0179741 | A1* | 6/2019 | Liu | G06F 12/0246 |
| 2020/0097403 | A1* | 3/2020 | Saxena | G06F 12/0246 |

FOREIGN PATENT DOCUMENTS

| KR | 10-2017-0003776 | 1/2017 |
| KR | 10-2017-0044780 | 4/2017 |

* cited by examiner

*Primary Examiner* — Tracy A Warren
(74) *Attorney, Agent, or Firm* — IP & T Group LLP

(57) ABSTRACT

Provided is an operation method of a controller which controls a memory device including a plurality of memory blocks. The operation method may include calculating a number of extended free blocks in the memory device based on valid page counts of the respective memory blocks, when a number of substantive free blocks in the memory device is less than a first threshold value, and performing a garbage collection operation when the number of extended free blocks is less than a second threshold value.

11 Claims, 17 Drawing Sheets

FIG. 2A

| Block1 | Block2 | Block3 | Block4 | Block5 |
|--------|--------|--------|--------|--------|
| Valid | Invalid | Invalid | Valid | Erase |
| Valid | Invalid | Invalid | Invalid | Erase |
| Valid | Invalid | Invalid | Invalid | Erase |
| Valid | Valid | Invalid | Invalid | Erase |
| Valid | Invalid | Invalid | Invalid | Erase |
| Valid | Invalid | Valid | Invalid | Erase |
| Invalid | Invalid | Invalid | Invalid | Erase |
| Valid | Invalid | Valid | Invalid | Erase |
| Valid | Invalid | Invalid | Invalid | Erase |
| Valid | Invalid | Invalid | Invalid | Erase |

FIG. 2B

| Valid | Erase | Erase | Erase | Valid |
|---|---|---|---|---|
| Valid | Erase | Erase | Erase | Valid |
| Valid | Erase | Erase | Erase | Valid |
| Valid | Erase | Erase | Erase | Valid |
| Valid | Erase | Erase | Erase | Erase |
| Valid | Erase | Erase | Erase | Erase |
| Valid | Erase | Erase | Erase | Erase |
| Valid | Erase | Erase | Erase | Erase |
| Valid | Erase | Erase | Erase | Erase |
| Invalid | Erase | Erase | Erase | Erase |
| Block1 | Block2 | Block3 | Block4 | Block5 |

FIG. 5

| Block # | Valid Page Count | Block State |
|---|---|---|
| 1 | 100 | Dirty Block |
| 2 | 10 | Pseudo Free Block |
| 3 | 5 | Pseudo Free Block |
| 4 | 70 | Dirty Block |
| 5 | 0 | Substantive Free Block |
| 6 | 40 | Dirty Block |
| ... | ... | ... |

~500

| # of Block | # of Substantive Free Block | # of Pseudo Free Block | # of Extended Free Block |
|---|---|---|---|
| 100 | 10 | 12 | 22 |

| Block # | Valid Page Count | Block State |
|---|---|---|
| 1 | 100 | Dirty Block |
| 2 | 10 | Dirty Block |
| 3 | 5 | Dirty Block |
| 4 | 70 | Dirty Block |
| 5 | 0 | Substantive Free Block |
| 6 | 40 | Dirty Block |
| ... | ... | ... |

~700

| # of Blocks | Total Valid Page Count | # of Extended Free Block | # of Substantive Free Block |
|---|---|---|---|
| 100 | 7500 | 25 | 10 |

702

CONTROLLER AND OPERATION METHOD THEREOF

CROSS-REFERENCE TO RELATED APPLICATION

This application claims priority under 35 U.S.C. § 119 to Korean Patent Application No. 10-2018-0155011 filed on Dec. 5, 2018, which is incorporated herein by reference in its entirety.

BACKGROUND

1. Field

Various embodiments relate to a controller, and more particularly, to a controller for controlling a memory device.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since memory systems have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Various embodiments are directed to a controller capable of preventing a performance degradation of a memory system, which may be caused by garbage collection.

In an embodiment, there is provided an operation method of a controller which controls a memory device including a plurality of memory blocks. The operation method may include: calculating a number of extended free blocks in the memory device based on valid page counts of the respective memory blocks, when a number of substantive free blocks in the memory device is less than a first threshold value; and performing a garbage collection operation when the number of extended free blocks is less than a second threshold value.

In an embodiment, there is provided a controller which controls a memory device including a plurality of memory blocks. The controller may include: a memory suitable for storing valid page counts of the respective memory blocks; and a processor suitable for calculating a number of extended free blocks in the memory device based on the valid page counts of the respective memory blocks when a number of substantive free blocks in the memory device is less than a first threshold value; and performing a garbage collection operation when the number of extended free blocks is less than a second threshold value.

In an embodiment, there is provided an operation method of a controller for controlling a memory device including plural memory blocks. The operation method may include: updating a first number of substantive free blocks and a second number of pseudo free blocks at each access to the memory blocks, the pseudo free block having a predetermined number of valid pages or less; and controlling, when the first number is a first threshold or less and sum of the first and second numbers is a second threshold or less, the memory device to perform a garbage collection operation to the memory blocks.

In an embodiment, there is provided an operation method of a controller for controlling a memory device including plural memory blocks. The operation method may include: updating a first number of substantive free blocks and a second number of extended free blocks at each access to the memory blocks, the second number being multiplication of a ratio of total invalid pages of the memory blocks and a total number of the memory blocks; and controlling, when the first number is a first threshold or less and the second numbers is a second threshold or less, the memory device to perform a garbage collection operation to the memory blocks.

BRIEF DESCRIPTION OF THE DRAWINGS

FIGS. 2A and 2B illustrate a memory device including a plurality of memory blocks.

FIG. 5 illustrates a block state table and a block number table in accordance with an embodiment.

FIG. 7 illustrates a block state table and a block number table in accordance with an embodiment.

DETAILED DESCRIPTION

Various embodiments will be described below in more detail with reference to the accompanying drawings. The following descriptions will be focused on only parts required for understanding operations in accordance with the present embodiments, and the descriptions of the other parts will be ruled out in order not to unnecessarily obscure subject matters of the present invention.

Hereafter, various embodiments will be described in more detail with reference to the accompanying drawings.

Figure 1:
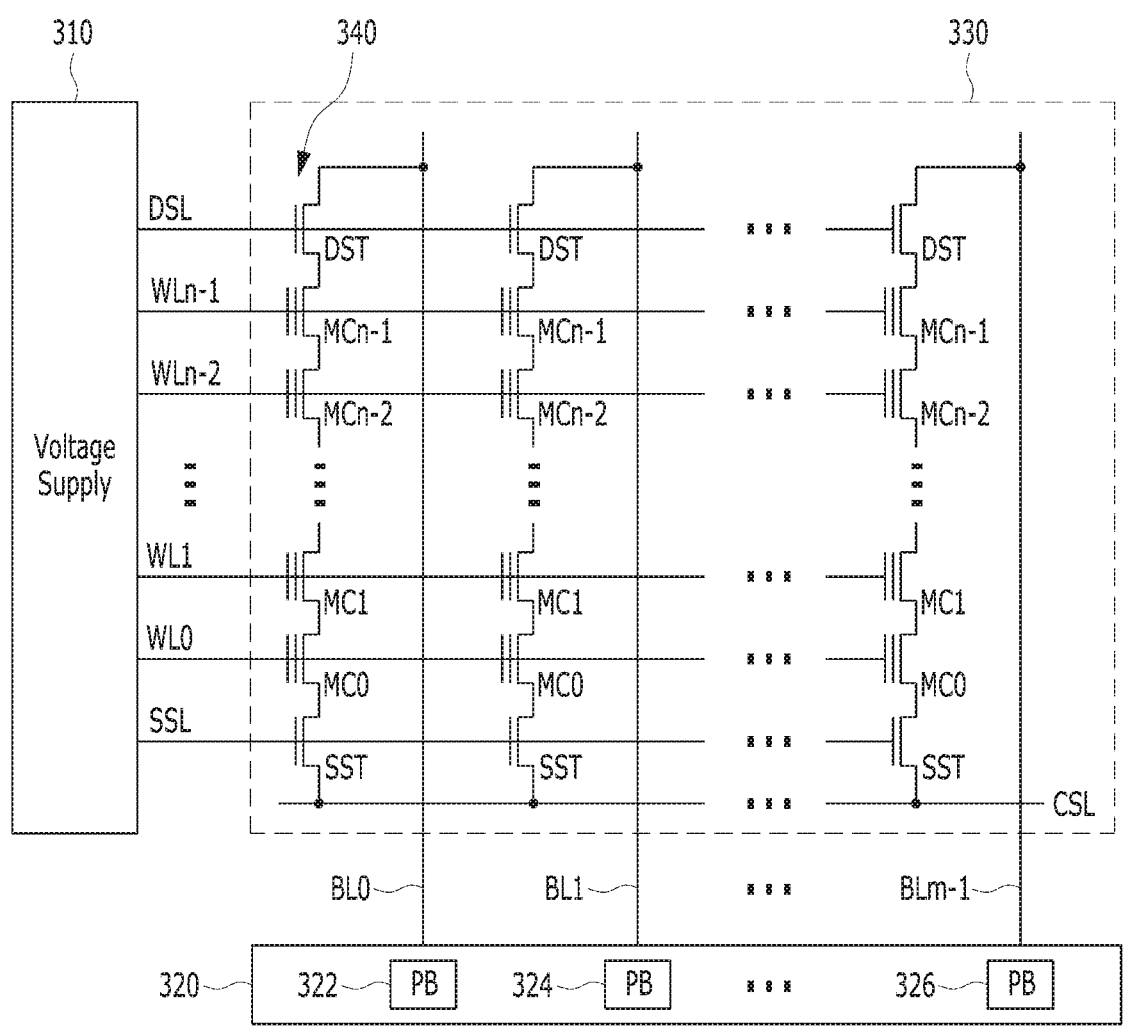
FIG. 1 illustrates a memory cell array included in a memory device which is controlled by a controller.

Referring to FIG. 1, a memory block 330, which may correspond to any of the plurality of memory blocks 152 to 156 included in the memory device 150 of the memory system 110 (described in FIG. 4), may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 1, the first cell string is coupled to the first bit line BL0, and the last cell string is coupled to the last bit line BLm−1. For reference, in FIG. 1, 'DSL' denotes a drain select line, 'GSL' denotes a ground select line, and 'CSL' denotes a common source line.

Although FIG. 1 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Each of the memory blocks included in the memory device 150 may be one among a single level cell (SLC) memory block, a multi-level cell (MLC) memory block, a triple level cell (TLC) memory block, a quadruple level cell (QLC) memory block, and a multiple level cell memory block capable of storing five or more-bit data in one memory cell according to the number of bits that may be stored in one memory cell.

The memory device 150 may be embodied by a two-dimensional (2D) or three-dimensional (3D) memory device. The memory device 150 may be embodied by a nonvolatile memory device having a 3D stack structure. When the memory device 150 has a 3D structure, the memory device 150 may include a plurality of memory blocks BLOCK0 to BLOCKN−1. Each of the memory blocks 152 to 156 may be realized in a 3D structure (or vertical structure). For example, the memory blocks 152 to 156 may be a three-dimensional structure with dimensions extending in first to third directions, e.g., an x-axis direction, a y-axis direction, and a z-axis direction.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

FIGS. 2A and 2B illustrate a memory device 150 including a plurality of memory blocks.

FIGS. 2A and 2B illustrate that the memory device 150 includes five memory blocks. Each of the memory blocks may correspond to the memory block 330 described with reference to FIG. 1.

Each of the memory blocks may include memory cells coupled to a plurality of word lines. When memory cells coupled to one word line are referred to as a page, each of the memory blocks may include a plurality of pages. Each of the memory blocks illustrated in FIGS. 2A and 2B may include ten pages.

The voltage supply 310 of FIG. 1 may apply a voltage to a word line to perform a write operation. That is, the minimum unit of the write operation of the memory device 150 may correspond to memory cells coupled to one word line, i.e. one page.

The voltage supply 310 may apply a voltage to all of the word lines included in the memory block 330 to perform an erase operation, thereby removing charges trapped in the memory cells included in the memory block 330. That is, the minimum unit of the erase operation of the memory device 150 may correspond to one memory block.

That is, the write operation and the erase operation of the memory device 150 may be performed on different bases, and the memory device 150 may not support an overwrite operation. Therefore, in order to update data stored in a certain page, the controller for controlling the memory device 150 may control the memory device 150 to write the data to be updated to another page, and invalidate the existing page.

In FIGS. 2A and 2B, for reference, a valid page is represented by "Valid", an invalid page is represented by "Invalid", and an erased page is represented by "Erase".

FIG. 2A illustrates the case in which only a fifth block Block5 is a substantive free block, and the other memory blocks are dirty blocks. The substantive free block may indicate a memory block in which all pages are erased pages or invalid pages, i.e. a memory block which will be able to be erased soon. The dirty block may indicate a memory block which is not a substantive free block.

Referring to FIG. 2A, when the number of invalidated pages in the memory device 150 increases, the memory device 150 may be short of memory space capable of storing data.

A series of operations in which the controller controls the memory device 150 to write valid pages of a victim block to a target block and controls the memory device 150 to perform an erase operation on the victim block in order to remove invalidated pages of a memory block may be referred to as a garbage collection (GC) operation.

FIG. 2B illustrates that a GC operation has been performed in the memory device 150 of FIG. 2A. When valid data of second to fourth blocks Block2 to Block4 are collected in the fifth block Block5, three substantive free blocks may be generated. Referring to FIG. 2B, the memory device 150 may perform a GC operation to secure a memory space capable of storing data.

The GC operation is a background operation. Although the GC operation is required for securing a memory space of the memory device 150, the throughput of a foreground operation of the memory system may be reduced while the GC operation is performed. Specifically, the memory device 150 cannot perform a read/write operation according to a request of a host at the same time while a read/write/erase operation is performed as a detailed operation of the GC operation. Thus, the throughput of the foreground operation may be reduced.

While a large amount of data is not stored in the memory device 150, the memory device 150 may not perform a GC operation in order to maintain throughput. Thus, according to the related art, the controller may perform a GC operation when the number of substantive free blocks included in the memory device 150 is less than a threshold value.

Figure 3A:
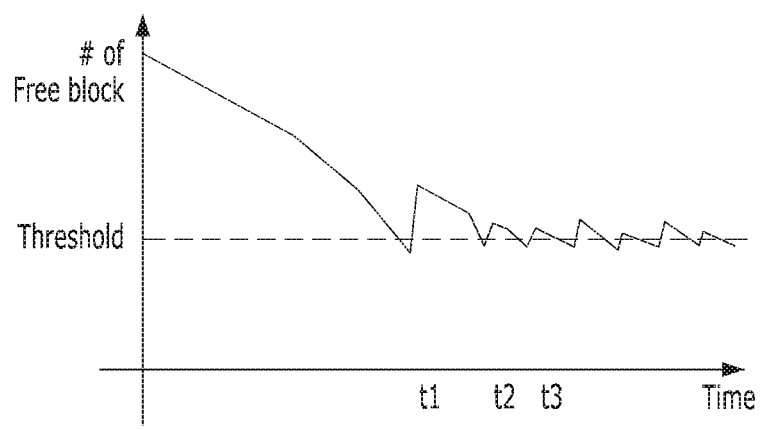
FIGS. 3A and 3B are graphs illustrating the number of substantive free blocks in a memory device and the throughput of the memory device, when a garbage collection operation is performed according to the related art.
Figure 3B:
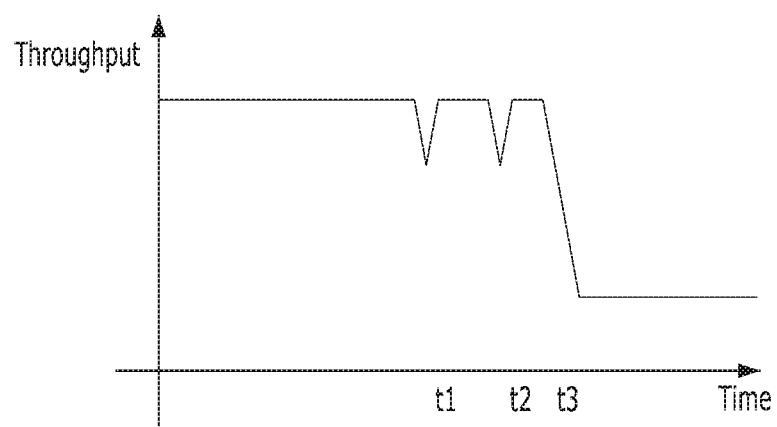

FIGS. 3A and 3B are graphs illustrating the number of substantive free blocks in the memory device 150 and the throughput of the memory device 150, when a GC operation is performed according to the related art. FIGS. 3A and 3B illustrate the number of substantive free blocks in the memory device 150 and the throughput of the memory device 150 when performing a test that continuously writes data to the memory device 150.

FIG. 3A illustrates the number of substantive free blocks depending on the amount of valid data stored in the memory device 150. In FIG. 3A, the horizontal axis may indicate time, and the vertical axis may indicate the number of substantive free blocks.

Referring to time points t1 and t2 in FIG. 3A, the number of substantive free blocks may reach the threshold value at which a GC operation is to be performed, even through a large amount of valid data is not stored. That is because memory blocks including a large number of invalidated pages, such as the second to fourth blocks Block2 to Block4 of FIG. 2A, occur while the data stored in the memory device 150 are updated.

Referring back to FIG. 2A, the number of substantive free blocks in the memory device 150 may correspond to 20% of the total number of memory blocks. However, since only 26% of the entire pages of the memory device 150 in FIG. 2A are valid pages, a user may recognize that only 26% of the memory space of the memory device 150 is used.

At this time, when a GC operation is performed as illustrated in FIG. 2B, valid data of the memory blocks including a plurality of invalidated pages may be collected in the substantive free block, such that a plurality of substantive free blocks are generated. FIG. 3A shows that the number of substantive free blocks in the memory device 150 increases immediately after the GC operation has been performed at time points t1 and t2.

FIG. 3B is a graph illustrating actual throughput of the memory system depending on the amount of valid data stored in the memory device 150. In FIG. 3B, the horizontal axis may indicate time, and the vertical axis may indicate the throughput of the memory system. The horizontal axis of FIG. 3B may be the same scale as that of FIG. 3A.

Referring to FIG. 3B, when a large portion of the memory space of the memory device 150 is not used, the performance of the memory device 150 may be reduced because the GC operation is performed even at time points t1 and t2, for example.

When a large portion of the memory space is not used, a user may expect that a GC operation will not be performed and the memory device 150 will exhibit high performance. However, according to the related art in which a GC operation is performed based on the number of substantive free blocks, the GC operation may be performed even when a large portion of the memory space is not used as described with reference to FIGS. 2A to 3B. Therefore, according to the related art, the memory device 150 may not exhibit the performance expected by the user.

In accordance with an embodiment, a memory block which is reference for whether to perform a GC operation may be defined as an extended free block. The extended free block may include a substantive free block and a pseudo free block. The controller for controlling the memory device 150 may perform a GC operation based on the number of extended free blocks.

In an embodiment, a memory block including a relatively small number of valid pages may be defined as a pseudo free block. Furthermore, the controller may calculate the number of extended free blocks based on the number of substantive free blocks and the number of pseudo free blocks, and perform a GC operation based on the number of extended free blocks.

In an embodiment, the controller may calculate the number of extended free blocks based on a total valid page count of the memory device 150, and perform a GC operation based on the number of extended free blocks.

When a GC operation is performed based on the number of extended free blocks, the controller may not perform a GC operation when a large amount of valid data is not stored in the memory device 150 even though the memory device 150 includes a small number of substantive free blocks. Therefore, the memory system including the memory device 150 may provide performance expected by a user.

Figure 4:
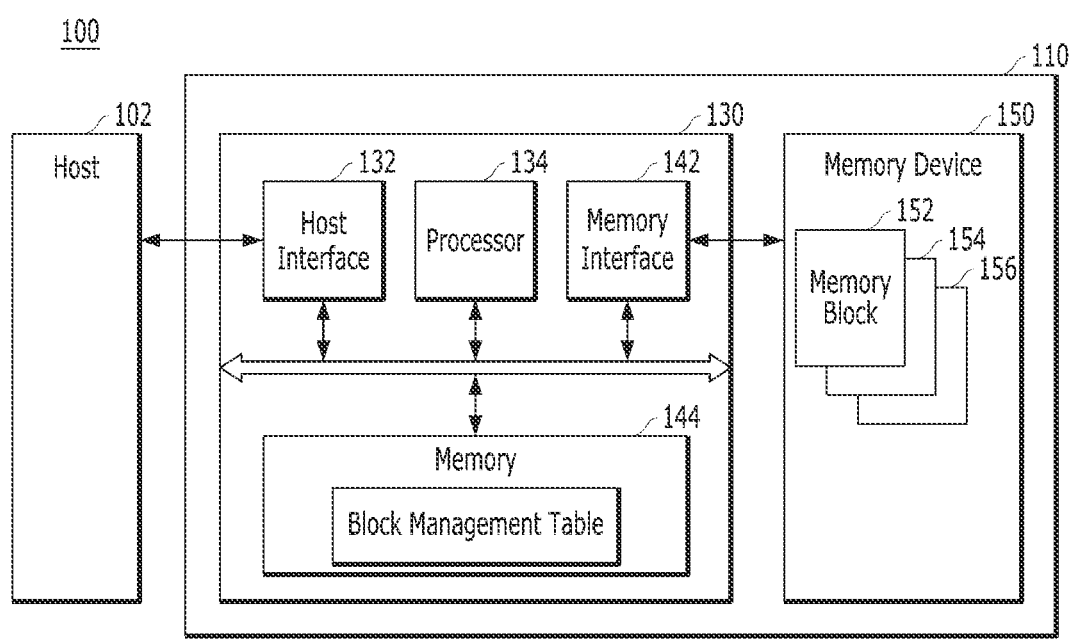
FIG. 4 schematically illustrates a memory system including a controller in accordance with an embodiment.

FIG. 4 schematically illustrates an example of a memory system 110 including a controller 130 in accordance with an embodiment.

The memory system 110 may operate to store data for the host 102 in response to a request of the host 102. Non-limiting examples of the memory system 110 may include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM), and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a memory device 150 and a controller 130.

The controller 130 and the memory device 150 may be integrated into a single semiconductor device, which may be included in the various types of memory systems as exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Non-limiting application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152, 154, 156 . . . (hereinafter, referred to as "memory blocks 152 to 156") each of which may include a plurality of pages, and each of the pages may include a plurality of memory cells coupled to a word line. In an embodiment, the memory device 150 may be a flash memory. The flash memory may have a 3-dimensional (3D) stack structure.

The structure of the memory device 150 has been described in detail with reference to FIG. 1.

The controller 130 may control the memory device 150 in response to a request from the host. For example, the controller 130 may provide data read from the memory device 150 to the host, and store data provided from the host into the memory device 150. For this operation, the controller 130 may control read, write, program, and erase operations of the memory device 150.

The controller 130 may include a host interface (I/F) 132, a processor 134, a memory I/F 142 such as a NAND flash controller (NFC), and a memory 144 all operatively coupled via an internal bus.

The host interface 132 may be configured to process a command and data of the host 102, and may communicate with the host 102 through one or more various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The host interface 132 may be driven through firmware referred to as a host interface layer (HIL) in order to exchange data with the host.

The memory I/F 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory interface 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The controller 130 may control the memory device 150 to perform read, write, program, and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random access memory (SRAM) or dynamic random access memory (DRAM). The memory 144 may be disposed within or out of the controller 130. FIG. 4 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

In accordance with an embodiment, the memory 144 may store a block management table. The block management table may include the numbers of valid pages of the respective memory blocks included in the memory device 150 and the block states of the respective memory blocks. The block management table will be described in detail with reference to FIGS. 5 and 7.

The processor 134 may control the overall operations of the memory system 110. The processor 134 may drive firmware to control the overall operations of the memory system 110. The firmware may be referred to as flash translation layer (FTL). Also, the processor 134 may be realized as a microprocessor or a central processing unit (CPU).

For example, the controller 130 may perform a foreground operation through the processor 134 implemented as a microprocessor or central processing unit (CPU).

The controller 130 may perform a background operation on the memory device 150 through the processor 134 implemented as a microprocessor or CPU. The above-described GC operation may also be performed as a background operation under control of the processor 134. Specifically, the processor 134 may perform the GC operation based on data included in the block management table.

FIG. 5 illustrates a block state table 500 and a block number table 502 in accordance with an embodiment.

The block state table 500 and the block number table 502 may include the block management table of FIG. 4.

The block state table 500 may include an identifier field, a valid page count field and a block state field of the respective memory blocks.

The block state may be set to any one of a dirty block, a substantive free block and a pseudo free block. The block state of each of the memory blocks may be decided based on the valid page count. Specifically, a memory block having a valid page count of '0', i.e. a memory block including no valid pages may be decided as a substantive free block. A memory block having a valid page count equal to or less than a threshold value is a memory block which can become a substantive free block through an operation of storing only a small amount of valid data into another memory block and erasing the corresponding memory block, and may be decided as a pseudo free block. A memory block having a valid page count more than the threshold value may be decided as a dirty block.

FIG. 5 illustrates the case in which the total number of memory blocks in the memory device 150 is 100 and each of the memory blocks includes 100 pages. In the block state table 500, a memory block having a valid page count equal to or less than 10 may be decided as a pseudo free block, for example.

The block number table 502 may store the number of memory blocks included in the memory device 150, the number of substantive free blocks, the number of pseudo free blocks, and the number of extended free blocks. The number of substantive free blocks and the number of pseudo free blocks may be decided based on the block states of the respective memory blocks, which are stored in the block state table 500. The number of extended free blocks may be decided based on the number of substantive free blocks and the number of pseudo free blocks. The controller 130 may decide whether to perform a GC operation based on the number of extended free blocks.

Figure 6A:
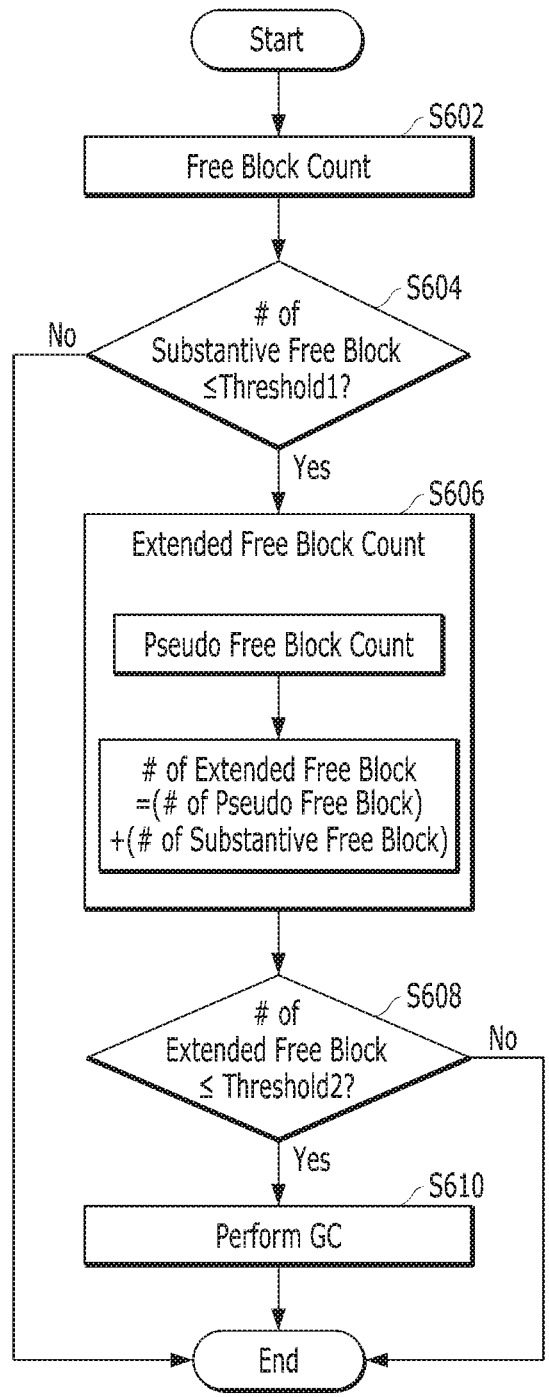
FIGS. 6A and 6B are flowcharts illustrating an operation of a controller in accordance with an embodiment.
Figure 6B:
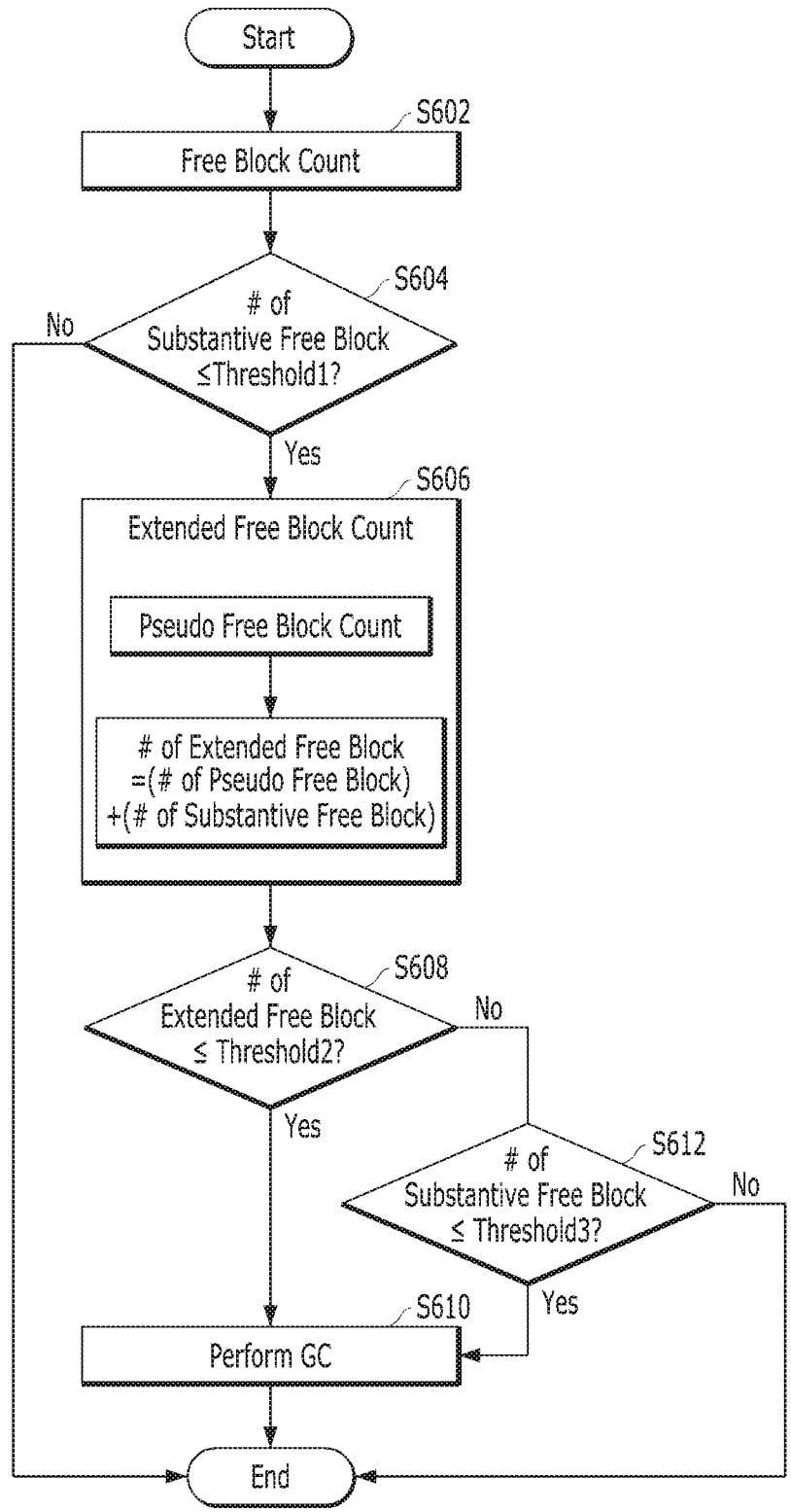

In an embodiment, the block number table 502 may be periodically updated based on changes of the block states of the block state table 500. FIGS. 6A and 6B illustrate that the processor 134 updates the block number table 502 while deciding whether to perform a GC operation. However, the present embodiment is not limited thereto, but the block number table 502 may be independently updated, and the processor 134 may refer to the block number table 502 in order to decide a GC operation.

FIGS. 6A and 6B are flowcharts illustrating an operation of the controller 130 in accordance with an embodiment.

FIG. 6A illustrates an embodiment of the method in which the controller 130 decides whether to perform a GC operation.

At step S602, the processor 134 may count the number of substantive free blocks based on the block state of the block state table 500. The processor 134 may update the block number table 502 based on the counted number of substantive free blocks.

At step S604, the processor 134 may check whether the number of substantive free blocks is equal to or less than a first threshold value Threshold1.

When the number of substantive free blocks exceeds the first threshold value ("No" at step S604), the processor 134 may end the operation.

When the number of substantive free blocks is equal to or less than the first threshold value ("Yes" at step S604), the processor 134 may calculate the number of extended free blocks based on the block state at step S606.

In accordance with the present embodiment, the processor 134 may count the number of pseudo free blocks based on the block state, and update the block number table 502. The processor 134 may calculate the number of extended free blocks based on the number of substantive free blocks and the number of pseudo free blocks, and update the block number table 502. In an embodiment, the number of extended free blocks may be derived by summing up the number of substantive free blocks and the number of pseudo free blocks.

At step S608, the processor 134 may check whether the number of extended free blocks is equal to or less than a second threshold value.

When the number of extended free blocks exceeds the second threshold value ("No" at step S608), it may indicate that there are a sufficient number of pseudo free blocks even though the number of substantive free blocks is equal to or less than the first threshold value. When the number of extended free blocks exceeds the second threshold value, the processor 134 may secure in a near future a plurality of substantive free blocks by performing a GC operation later. Therefore, the processor 134 may end the operation without performing the GC operation.

When the number of extended free blocks is equal or less than the second threshold value ("Yes" at step S608), the processor 134 may perform a GC operation at step S610.

FIG. 6B illustrates an embodiment of the method in which the controller 130 decides whether to perform a GC operation.

Steps S602 to S606 may be performed in the same manner as described with reference to FIG. 6A.

At step S608, the processor 134 may check whether the number of extended free blocks is equal to or less than the second threshold value.

When the number of extended free blocks is equal to or less than the second threshold value ("Yes" at step S608), the processor 134 may perform a GC operation at step S610.

On the other hand, when the memory device has no substantive free blocks even though the number of extended free blocks exceeds the second threshold value ("No" at step S608), the processor 134 cannot perform a GC operation. Thus, the processor 134 may check whether the number of substantive free blocks is equal to or less than a third threshold value, at step S612. The third threshold value may indicate a minimum number of substantive free blocks, which needs to be maintained for the processor 134 to perform a GC operation.

When the number of substantive free blocks is equal to or less than the third threshold value ("Yes" at step S612), the processor 134 may perform a GC operation at step S610.

When the number of substantive free blocks exceeds the third threshold value ("No" at step S612), the processor 134 may end the operation.

FIG. 7 illustrates a block state table 700 and a block number table 702 in accordance with an embodiment.

The block management table of FIG. 4 may include the block state table 700 and the block number table 702.

The block state table 700 may include an identifier field, a valid page count field and a block state field of the respective memory blocks.

The block state may be set to any one of a dirty block and a substantive free block. The block state of each of the memory blocks may be decided based on the valid page count. A memory block having no valid pages may be decided as a substantive free block, and a memory block having valid pages may be decided as a dirty block.

FIG. 7 illustrates the case in which the total number of memory blocks in the memory device 150 is 100 and each of the memory blocks includes 100 pages.

The block number table 702 may store the number of memory blocks included in the memory device 150, a total valid page count, the number of substantive free blocks and the number of extended free blocks. The total valid page count may indicate a value obtained by summing up the valid page counts of all the memory blocks included in the memory device 150.

The number of extended free blocks may be decided based on the total number of memory blocks and the total valid page count. In the example of FIG. 7, a value obtained by multiplying a ratio (75%) of the total valid page count (7500) of the memory device 150 with the total number (100) of memory blocks is 75. This value of 75 may indicate that valid data are stored in a memory space amounting to 75 memory blocks among 100 memory blocks in total in the memory device 150. The value obtained by multiplying a ratio of the total valid page count with the total number of memory blocks may be defined as the number of effective valid blocks.

Therefore, ideally remaining 25 memory blocks other than the effective valid blocks among the total memory blocks may be immediately ready for storing data. That is, a value obtained by subtracting the number of effective valid blocks from the total number of memory blocks may indicate the number of extended free blocks.

The controller 130 may decide whether to perform a GC operation based on the number of extended free blocks.

Figure 8A:
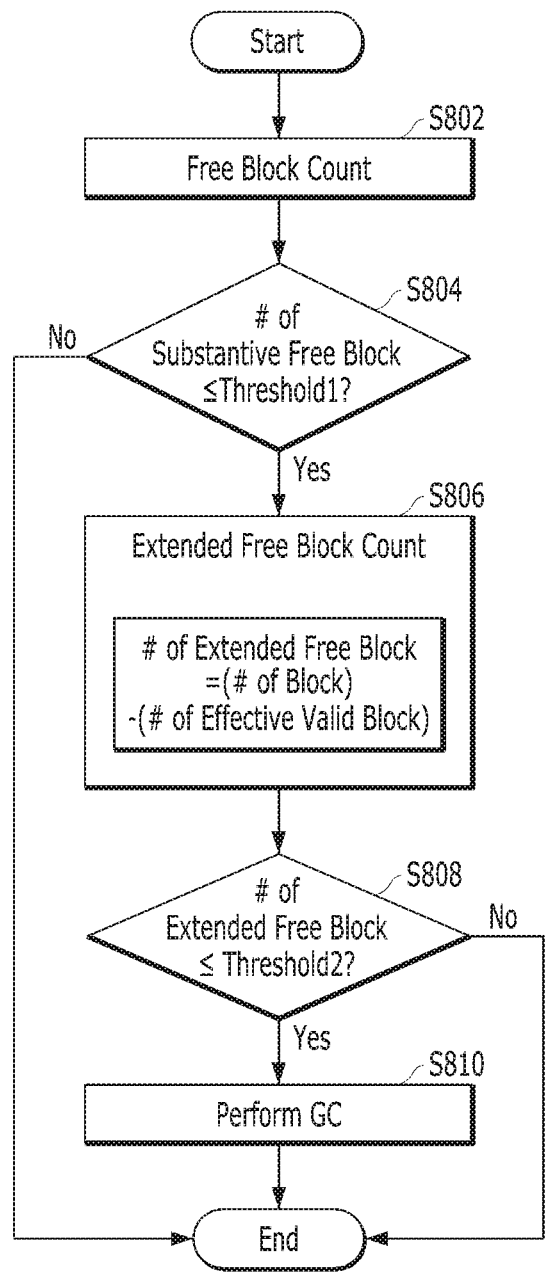
FIGS. 8A and 8B are flowcharts illustrating an operation of a controller in accordance with an embodiment.
Figure 8B:
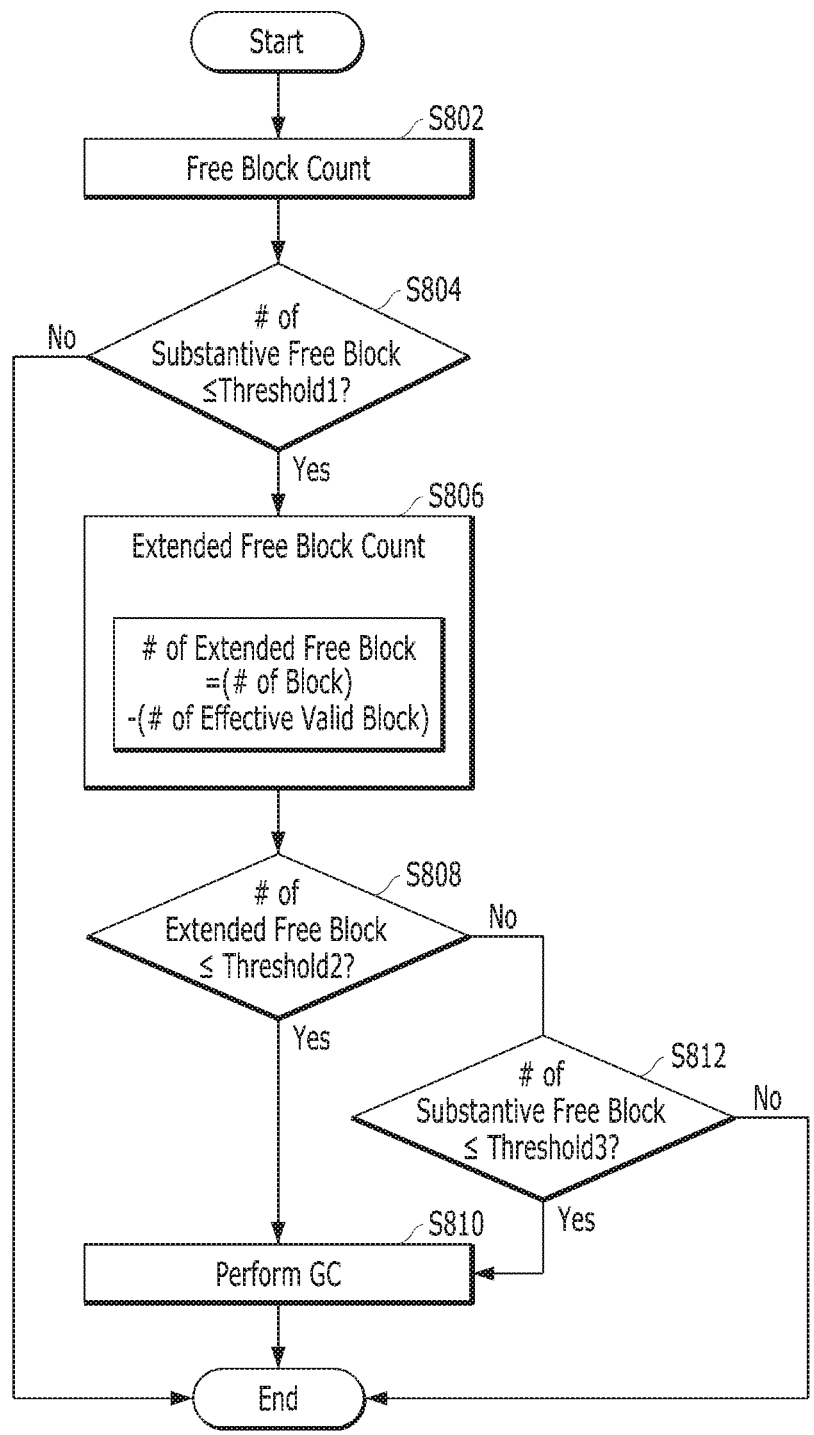

FIGS. 8A and 8B are flowcharts illustrating an operation of the controller 130 in accordance with an embodiment.

FIG. 8A illustrates an embodiment of the method in which the controller 130 decides whether to perform a GC operation.

At step S802, the processor 134 may count the number of substantive free blocks based on the block state of the block state table 700. The processor 134 may update the block number table 702 based on the counted number of substantive free blocks.

At step S804, the processor 134 may check whether the number of substantive free blocks is equal to or less than a first threshold value Threshold1.

When the number of substantive free blocks exceeds the first threshold value ("No" at step S804), the processor 134 may end the operation.

When the number of substantive free blocks is equal to or less than the first threshold value ("Yes" at step S804), the processor 134 may calculate the number of extended free blocks based on the block state at step S806.

As described above, the processor 134 may calculate the number of effective valid blocks based on the total valid page count and the total number of memory blocks, and calculate the number of extended free blocks.

At step S808, the processor 134 may check whether the number of extended free blocks is equal to or less than a second threshold value.

When the number of extended free blocks exceeds the second threshold value ("No" at step S808), it may indicate that there are a sufficient number of pseudo free blocks even though the number of substantive free blocks is equal to or less than the first threshold value. When the number of extended free blocks exceeds the second threshold value, the processor 134 may secure in a near future a plurality of substantive free blocks by performing a GC operation later even though the GC operation is not performed immediately. Therefore, the processor 134 may end the operation without performing the GC operation.

When the number of extended free blocks is equal to or less than the second threshold value ("Yes" at step S808), the processor 134 may perform a GC operation at step S810.

FIG. 8B illustrates an embodiment of the method in which the controller 130 decides whether to perform a GC operation.

Steps S802 to S806 may be performed in the same manner as described with reference to FIG. 8A.

At step S808, the processor 134 may check whether the number of extended free blocks is equal to or less than the second threshold value.

When the number of extended free blocks is equal to or less than the second threshold value ("Yes" at step S808), the processor 134 may perform a GC operation at step S810.

On the other hand, when the number of extended free blocks exceeds the second threshold value ("No" at step S808), the processor 134 may check whether the number of substantive free blocks is equal to or less than a third threshold value at step S812. The third threshold value may indicate a minimum number of substantive free blocks, which is required for the processor 134 to perform a GC operation.

When the number of substantive free blocks is equal to or less than the third threshold value ("Yes" at step S812), the processor 134 may perform a GC operation at step S810.

When the number of substantive free blocks exceeds the third threshold value ("No" at step S812), the processor 134 may end the operation.

Figure 9A:
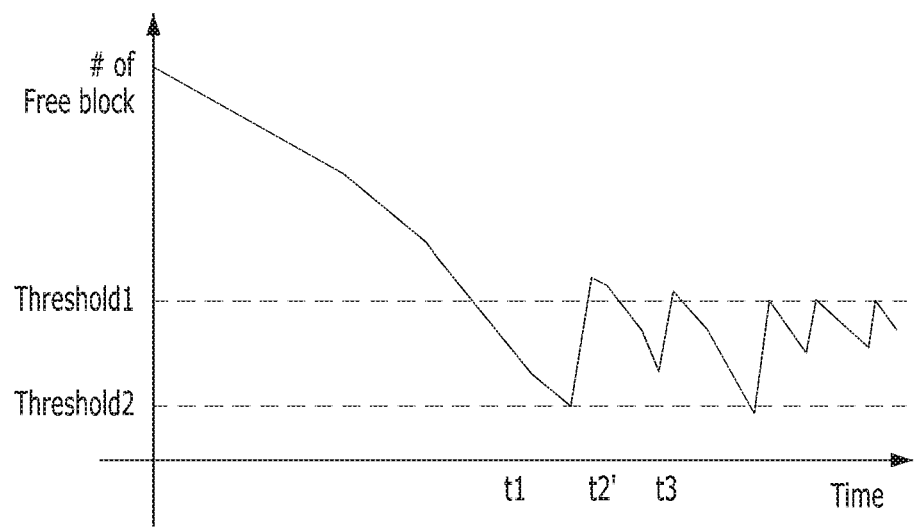
FIGS. 9A and 9B are graphs illustrating the throughput of a memory system, when a garbage collection operation is performed in accordance with an embodiment.
Figure 9B:
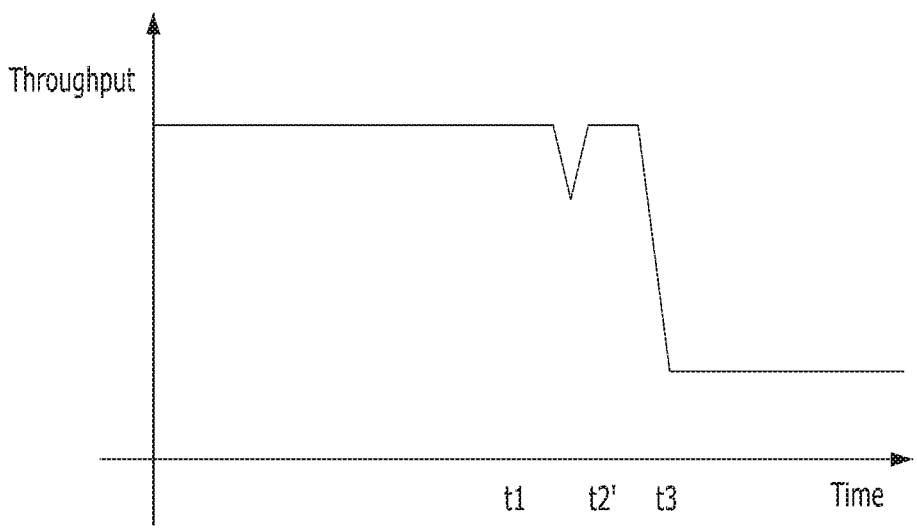

FIGS. 9A and 9B are graphs illustrating the performance of the memory system 110 when a GC operation is performed in accordance with an embodiment. FIGS. 3A and 3B illustrate the performance of the memory system 110 when performing a test that continuously writes data to the memory system 110.

In accordance with the present embodiment, the controller 130 may perform a GC operation based on the number of extended free blocks, which is calculated based on the valid page counts of the respective memory blocks included in the memory device 150.

FIG. 9A illustrates the number of substantive free blocks depending on the amount of valid data stored in the memory device 150. In FIG. 9A, the horizontal axis may indicate time, and the vertical axis may indicate the number of substantive free blocks.

Referring to a time point t1 of FIG. 9A, the processor 134 may not perform a GC operation even when the number of substantive free blocks in the memory device 150 is equal to or less than the first threshold value, as described at steps S604 and S804. In an embodiment, when the number of substantive free blocks in the memory device 150 is equal to or less than the first threshold value and the number of extended free blocks is equal to or less than the second threshold value, or when the memory device 150 has a small valid page count, the processor 134 may perform a GC operation. Referring to a time point t2' of FIGS. 9A and 9B, the processor 134 may perform a GC operation when the number of substantive free blocks in the memory device 150 is equal to or less than the third threshold value, depending on an embodiment.

Referring to a time point t3 of FIG. 9A, when the valid page count decreases as the memory device 150 is used, the number of extended free blocks in the memory device 150 may be constantly maintained while a GC operation is continuously performed.

FIG. 9B illustrates the throughput of the memory device 150 depending on the amount of valid data stored in the memory device 150. In FIG. 9B, the horizontal axis may indicate time, and the vertical axis may indicate the throughput of the memory device 150. The horizontal axis of FIG. 9B may be the same scale as that of FIG. 9A.

Although the number of substantive free blocks is so low that a GC operation needs to be performed, the processor 134 may not perform the GC operation when a plurality of substantive free blocks can be secured if the GC operation is performed later, because there are a sufficient number of extended free blocks at the time point t1. Therefore, in accordance with the present embodiments, when a large portion of the memory space is not used from the viewpoint of a user, a GC operation may not be performed. Thus, it is possible to provide sufficient throughput of the memory system 110, which is expected by a user.

FIGS. 10 to 18 are diagrams schematically illustrating application examples of the data processing system of FIGS. 1 to 9 according to various embodiments.

Figure 10:
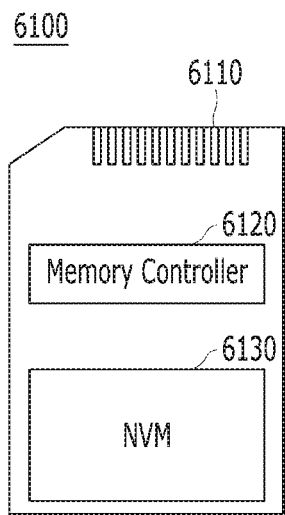
FIGS. 10 to 18 are diagrams schematically illustrating application examples of the data processing system, in accordance with various embodiments of the present invention.

FIG. 10 is a diagram schematically illustrating the data processing system including the memory system in accordance with an embodiment. FIG. 10 schematically illustrates a memory card system 6100 to which the memory system in accordance with an embodiment is applied.

Referring to FIG. 10, the memory card system 6100 may include a memory controller 6120, a memory device 6130 and a connector 6110.

Specifically, the memory controller 6120 may be connected to the memory device 6130 embodied by a nonvolatile memory (NVM), and configured to access the memory device 6130. For example, the memory controller 6120 may be configured to control read, write, erase, and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 4, and the memory device 6130 may correspond to the memory device 150 of the memory system 110 described with reference to FIG. 4.

Thus, as shown in FIG. 4, the memory controller 6120 may include a random access memory (RAM), a processor, a host interface, a memory interface and an error correction component.

The memory controller 6120 may communicate with an external device, for example the host 102 of FIG. 4, through the connector 6110. For example, as described with reference to FIG. 4, the memory controller 6120 may be configured to communicate with an external device through one or more various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and a universal flash storage (UFS).

Figure 11:
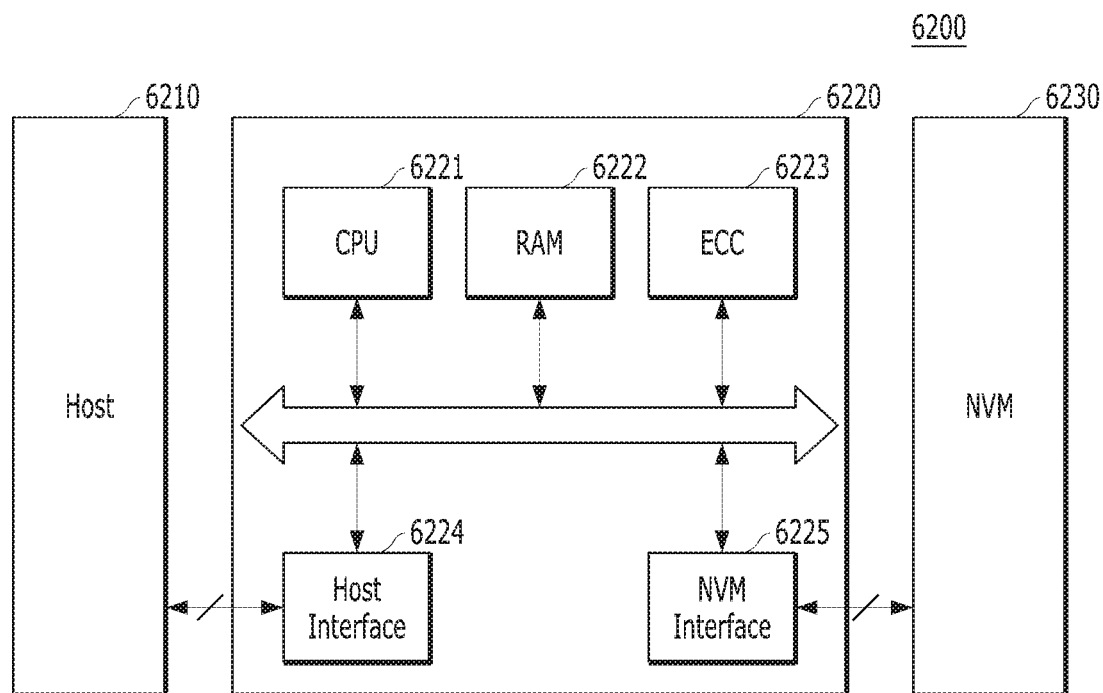

FIG. 11 is a diagram schematically illustrating another example of a data processing system 6200 including the memory system in accordance with an embodiment.

Referring to FIG. 11, the data processing system 6200 may include a memory device 6230 having one or more nonvolatile memories (NVMs) and a memory controller 6220 for controlling the memory device 6230. The data processing system 6200 may serve as a storage medium such as a memory card (CF, SD, micro-SD or the like) or USB device, as described with reference to FIG. 4. The memory device 6230 may correspond to the memory device 150 in the memory system 110 illustrated in FIG. 4, and the memory controller 6220 may correspond to the controller 130 in the memory system 110 illustrated in FIG. 4.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224, and a memory interface such as an NVM interface 6225.

The CPU 6221 may control overall operations on the memory device 6230, for example, read, write, file system management, and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may transmit and/or receive data to and/or from the host 6210 through the host interface 6224, and transmit/receive data to/from the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 12:
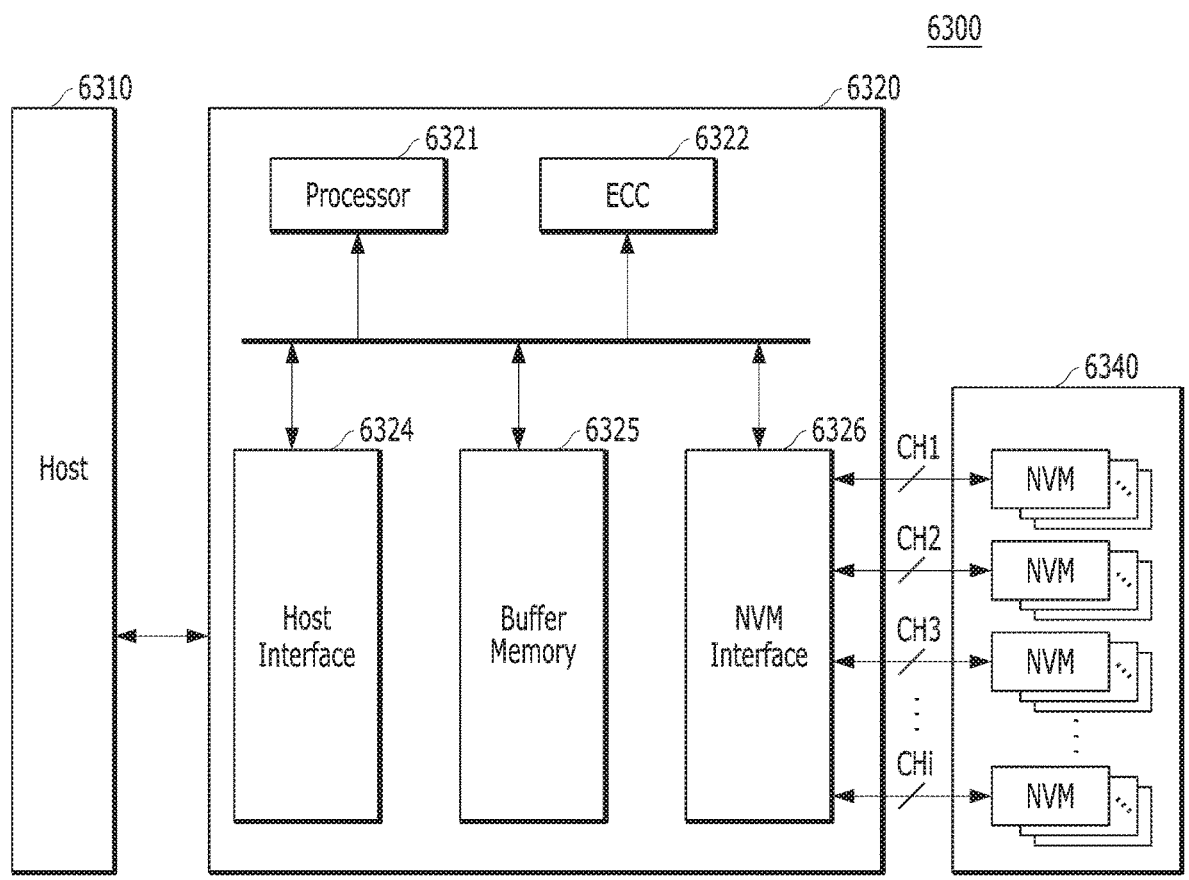

FIG. 12 is a diagram schematically illustrating another example of the data processing system including the memory system in accordance with an embodiment. FIG. 12 schematically illustrates a solid state drive (SSD) 6300 to which the memory system may be applied.

Referring to FIG. 12, the SSD 6300 may include a controller 6320 and a memory device 6340 including a plurality of nonvolatile memories (NVMs). The controller 6320 may correspond to the controller 130 in the memory system 110 of FIG. 4, and the memory device 6340 may correspond to the memory device 150 in the memory system of FIG. 4.

Specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of nonvolatile memories NVM, for example, map data including a mapping table. The buffer memory 6325 may be embodied by volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). For convenience of description, FIG. 10 illustrates that the buffer memory 6325 exists in the controller 6320. However, the buffer memory 6325 may exist outside the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
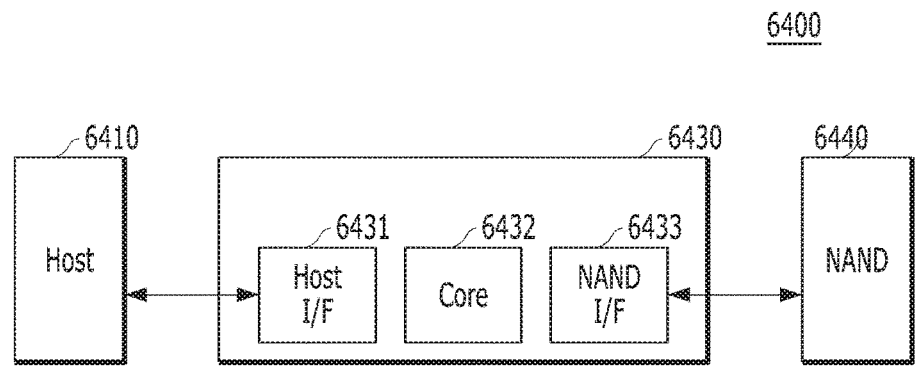

FIG. 13 is a diagram schematically illustrating another example of the data processing system including the memory system in accordance with an embodiment. FIG. 13 schematically illustrates an embedded Multi-Media Card (eMMC) 6400 to which the memory system may be applied.

Referring to FIG. 13, the eMMC 6400 may include a controller 6430 and a memory device 6440 embodied by one or more NAND flash memories. The controller 6430 may correspond to the controller 130 in the memory system 110 of FIG. 4, and the memory device 6440 may correspond to the memory device 150 in the memory system 110 of FIG. 4.

Specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 4. Furthermore, the host interface 6431 may serve as a serial interface, for example, Ultra High Speed (UHS)-I and UHS-II interface.

The memory controller 6120, the memory controller 6220, the controller 6320 and the controller 6430, which have been described with reference to FIGS. 10 to 13, may perform a GC operation on the memory device 6130, the memory device 6230, the memory device 6340 and the memory device 6440, respectively, based on the number of extended free blocks, thereby maintaining the performance of the memory system.

FIGS. 14 to 17 are diagrams schematically illustrating other examples of the data processing system including the memory system in accordance with one or more embodiments. FIGS. 14 to 17 schematically illustrate universal flash storage (UFS) systems to which the memory system may be applied.

The memory systems in accordance with the various embodiments described with reference to FIGS. 1 to 13 may be applied to a UFS which is described with reference to FIGS. 14 to 17.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices, particularly mobile electronic devices through UFS protocols. The UFS devices 6520, 6620, 6720 and 6820 and the UFS cards 6530, 6630, 6730 and 6830 may be embodied by the memory system 110 illustrated in FIG. 4. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 14:
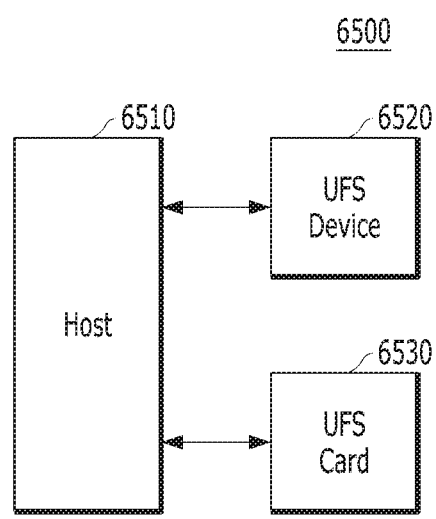

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In an embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 15:
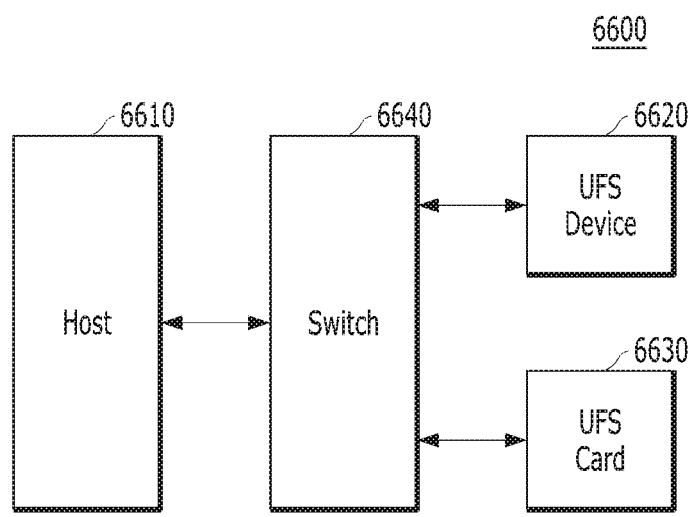

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In an embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
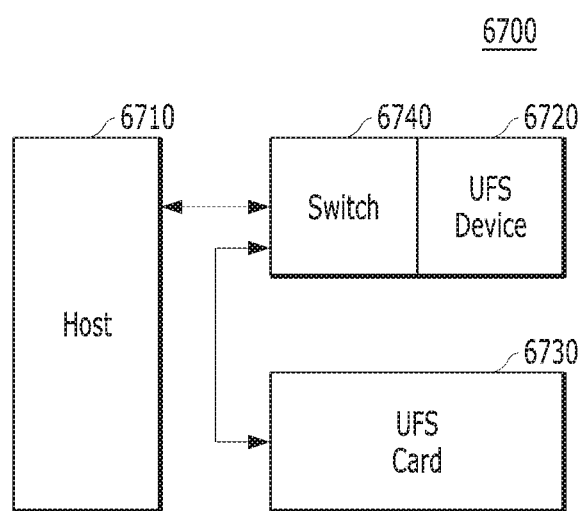

In the UFS system 6700 illustrated in FIG. 16, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In an embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
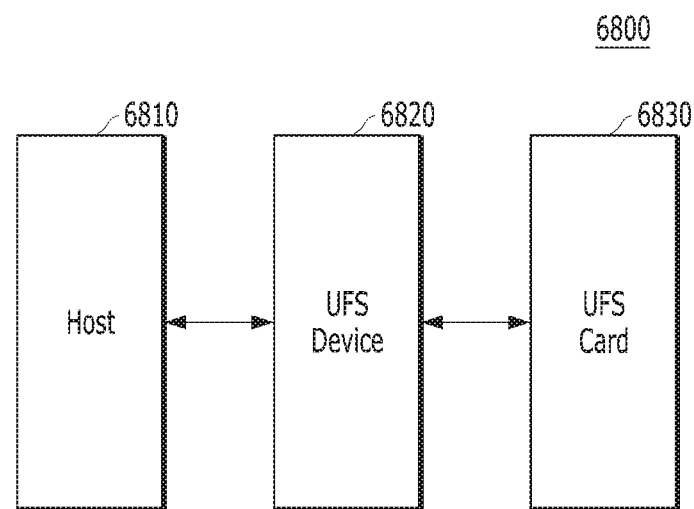

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. At this time, the host 6810 and the UFS card 6830 may communicate with each other through target ID switching between the M-PHY and UniPro modules of the UFS device 6820. In an embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
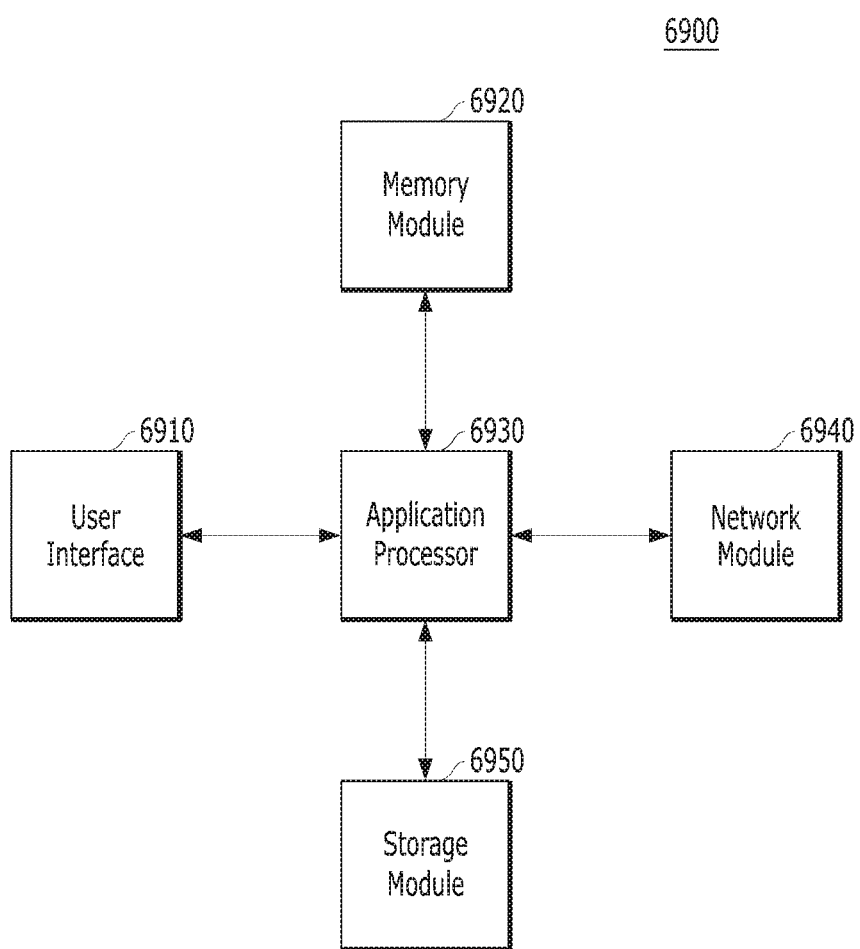

FIG. 18 is a diagram schematically illustrating another example of the data processing system including the memory system in accordance with an embodiment. FIG. 18 is a diagram schematically illustrating a user system 6900 to which the memory system may be applied.

Referring to FIG. 18, the user system 6900 may include a user interface 6910, a memory module 6920, an application processor 6930, a network module 6940, and a storage module 6950.

Specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory, or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 4. Furthermore, the storage module 6950 may be embodied as an SSD, eMMC and UFS as described above with reference to FIGS. 12 to 17.

In an embodiment, the storage module 6950 may not perform a GC operation when there are a sufficient number of extended free blocks even though there are a small number of substantive free blocks, in order to maintain the performance of the memory system.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 4 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

In accordance with the present embodiments, it is possible to provide a controller capable of preventing a performance degradation of a memory system, which may be caused by a GC operation, and an operation method thereof.

Although various embodiments have been described for illustrative purposes, it will be apparent to those skilled in the art that various changes and modifications may be made without departing from the spirit and scope of the invention as defined in the following claims.

What is claimed is:

1. An operation method of a controller which controls a memory device including a plurality of memory blocks, the operation method comprising:
    deciding a number of pseudo free blocks having a valid page count greater than '0' and less than a predetermined threshold;
    deciding a number of substantive free blocks having a valid page count '0';
    calculating a number of extended free blocks in the memory device based on the number of pseudo free blocks and the number of substantive free blocks;
    determining whether the number of substantive free blocks is less than a first threshold value and the number of extended free blocks is less than a second threshold value;
    performing a garbage collection operation when the number of substantive free blocks is less than the first threshold value and the number of extended free blocks is less than the second threshold value; and
    performing the garbage collection operation when the number of substantive free blocks is less than a third threshold value which is smaller than the first threshold value.

2. An operation method of a controller which controls a memory device including a plurality of memory blocks, the operation method comprising:
    calculating a total valid page count by summing up valid page counts of respective memory blocks;
    calculating a number of extended free blocks based on the total valid page count;
    determining whether a number of substantive free blocks is less than a first threshold value and a number of extended free blocks is less than a second threshold value; and
    performing a garbage collection operation when the number of substantive free blocks is less than the first threshold value and the number of extended free blocks is less than the second threshold value;
    deciding block statuses of the respective memory blocks based on the valid page counts; and
    performing the garbage collection operation when the number of substantive free blocks is less than a third threshold value which is smaller than the first threshold value.

3. The operation method of claim 2, wherein the calculating of the number of extended free blocks comprises:

calculating a number of effective valid blocks based on the total valid page count and a total number of memory blocks; and calculating the number of extended free blocks based on the number of effective valid blocks and the total number of memory blocks.

4. The operation method of claim 2, wherein the deciding of the block statuses of the respective memory blocks based on the valid page counts comprises:

deciding a memory block having a valid page count of '0' as a substantive free block; and deciding a memory block having a non-zero valid page count as a dirty block.

5. The operation method of claim 1, wherein the performing of the garbage collection operation comprises:

writing data stored in valid pages of a dirty block to a substantive free block; and erasing the dirty block.

6. A controller which controls a memory device including a plurality of memory blocks, the controller comprising:

a memory suitable for storing valid page counts of respective memory blocks; and a processor suitable for:

deciding a number of pseudo free blocks having a valid page count greater than '0' and less than a predetermined threshold;

deciding a number of substantive free blocks having a valid page count '0';

calculating a number of extended free blocks in the memory device based on the number of pseudo free blocks and the number of substantive free blocks when the number of substantive free blocks in the memory device is less than a first threshold value;

performing a garbage collection operation when the number of extended free blocks is less than a second threshold value; and performing the garbage collection operation when the number of substantive free blocks is less than a third threshold value which is smaller than the first threshold value.

7. A controller which controls a memory device including a plurality of memory blocks, the controller comprising:

a memory suitable for storing valid page counts of respective memory blocks; and a processor suitable for:

calculating a total valid page count by summing up valid page counts of the respective memory blocks when a number of substantive free blocks in the memory device is less than a first threshold value;

calculating a number of extended free blocks based on the total valid page count;

performing a garbage collection operation when the number of extended free blocks is less than a second threshold value; and performing, when the number of extended free blocks is equal to or more than a threshold value, the garbage collection operation in the case that the number of substantive free blocks is smaller than a minimum number of substantive free blocks which needs to be maintained to perform the garbage collection operation.

8. The controller of claim 7, wherein the processor calculates the number of extended free blocks by:

calculating a number of effective valid blocks based on the total valid page count and a total number of memory blocks; and calculating the number of extended free blocks based on the number of effective valid blocks and the total number of memory blocks.

9. The controller of claim 7, wherein the processor is further suitable for deciding block statuses of the respective memory blocks by deciding a memory block having a valid page count of '0' as a substantive free block and by deciding a memory block having a non-zero valid page count as a dirty block.

10. The controller of claim 6, wherein the processor performs the garbage collection operation by writing data stored in valid pages of a dirty block to a substantive free block, and erasing the dirty block.

11. An operating method of a controller for controlling a memory device including plural memory blocks, the operating method comprising:

updating a first number of substantive free blocks and a second number of pseudo free blocks, the pseudo free block having more than '0' and less than a predetermined number of valid pages, and the substantive free block having no valid page;

determining whether the first number is a first threshold or less, and sum of the first and second numbers is a second threshold or less;

controlling, when the first number is the first threshold or less and sum of the first and second numbers is the second threshold or less, the memory device to perform a garbage collection operation to the memory blocks; and controlling, when the first number is less than a third threshold value which is smaller than the first threshold, the memory device to perform the garbage collection operation to the memory blocks.

* * * * *